June 30, 1970  R. D. RUMSEY ET AL  3,517,946
FIFTH WHEEL VISCOUS DAMPER CONSTRUCTION
Filed Nov. 28, 1967  3 Sheets-Sheet 2

INVENTORS
ROLLIN DOUGLAS RUMSEY
GORDON W. KAMMAN
ROBERT I. HUGHSON
ATTORNEYS

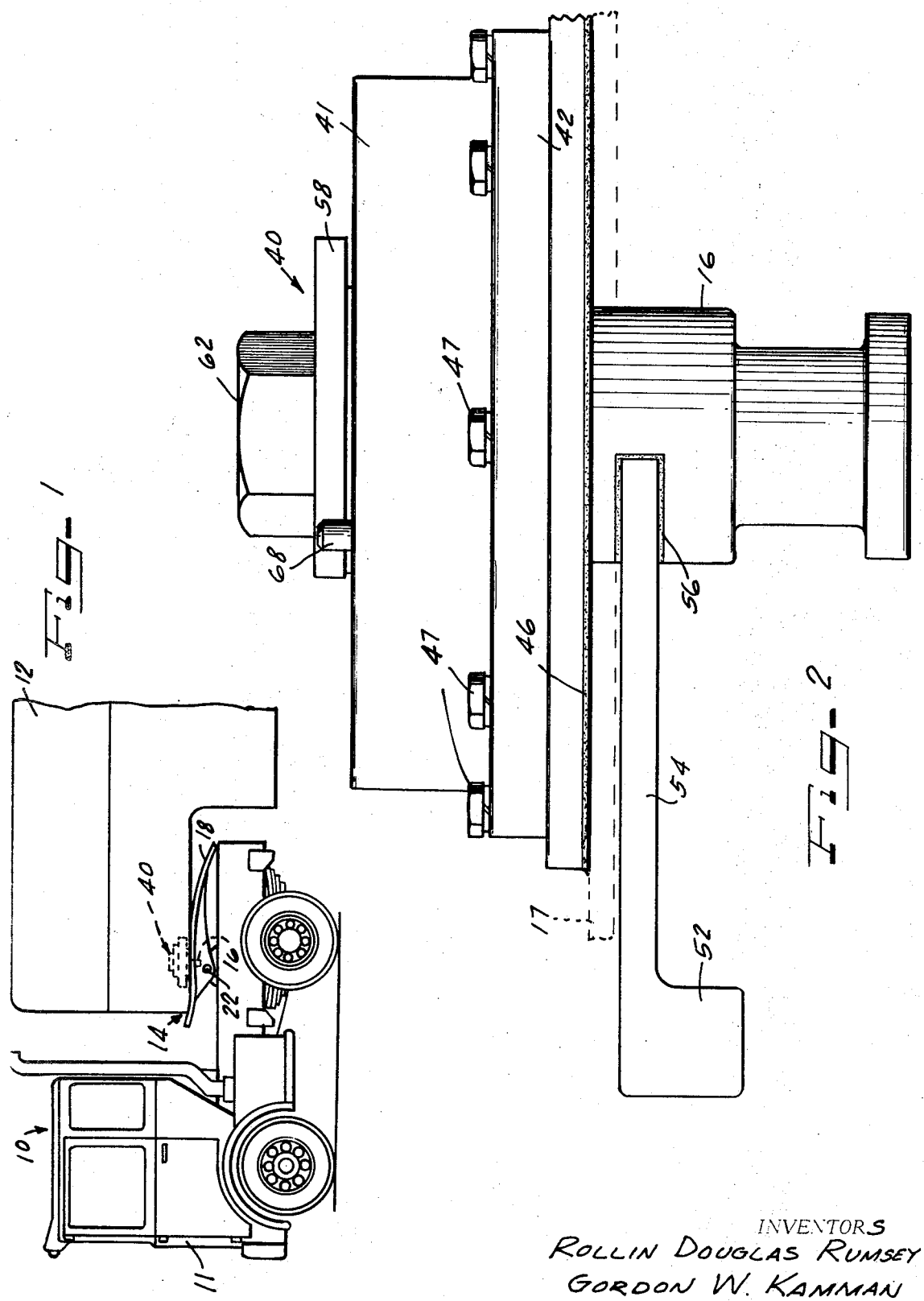

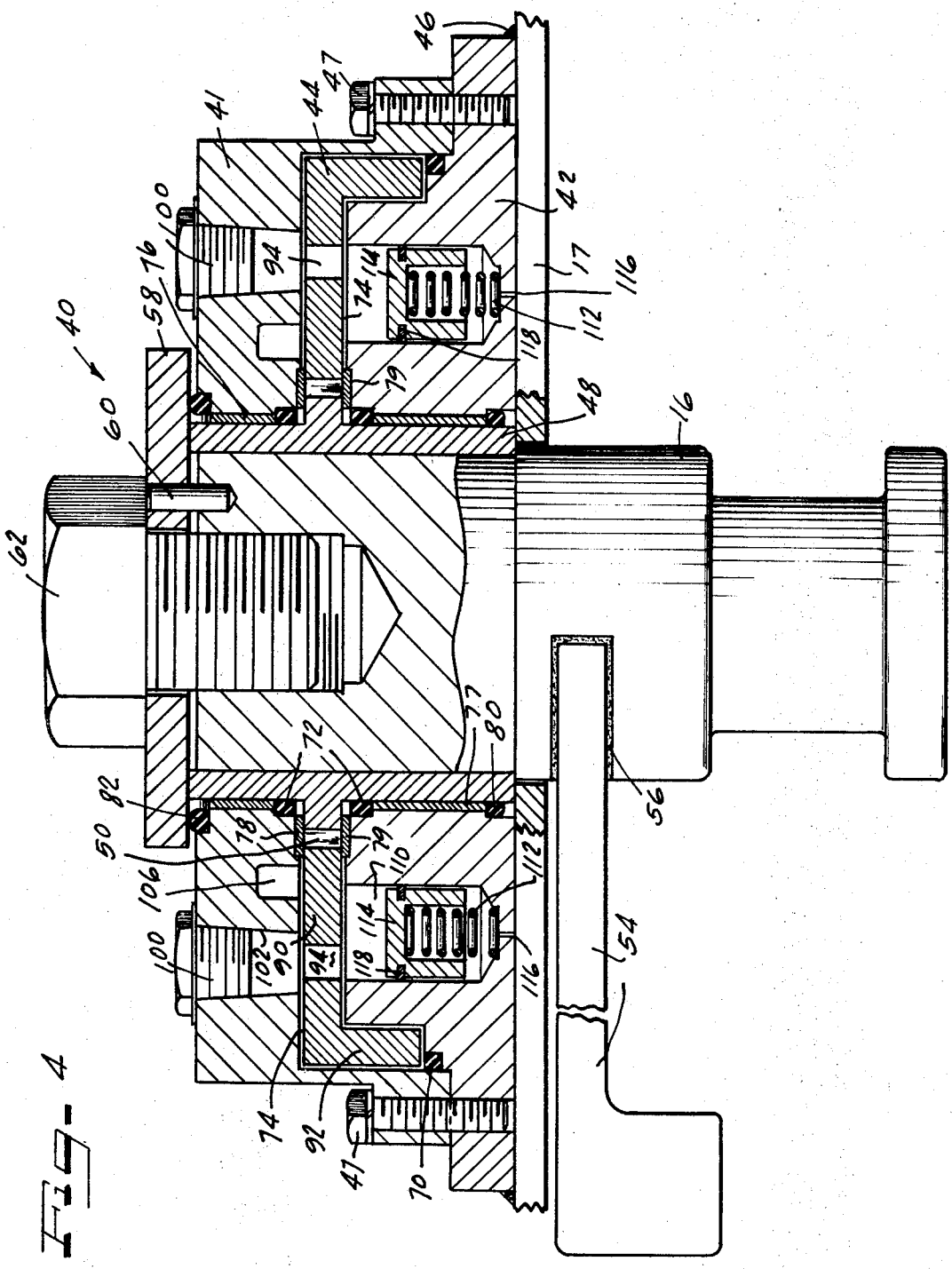

United States Patent Office 3,517,946
Patented June 30, 1970

3,517,946
FIFTH WHEEL VISCOUS DAMPER CONSTRUCTION
Rollin Douglas Rumsey and Gordon W. Kamman, Buffalo, and Robert I. Hughson, Tonawanda, N.Y., assignors to Houdaille Industries, Inc., Buffalo, N.Y., a corporation of Michigan
Filed Nov. 28, 1967, Ser. No. 686,011
Int. Cl. B62d 53/08
U.S. Cl. 280—432                              10 Claims

ABSTRACT OF THE DISCLOSURE

A fifth wheel assembly for a tractor and a trailer comprising a viscous damper mounted on the trailer, a kingpin removably secured in the damper, a fifth wheel plate having a kingpin receiving slot mounted on the tractor, the viscous damper including, a rotor assembly, an upper and lower housing, and a hub concentric with the portion of the king pin in the viscous damper, and the hub being connected by a spline joint to the rotor assembly.

Field of the invention

This invention pertains to improvements in fifth wheel assemblies and refers more particularly to a fifth wheel coupler having a removable kingpin secured in a rotary viscous damper.

Prior art

In the usual trailer-truck arrangement, a trailer unit is coupled to a tractor which provides motive power for drawing the trailer, and the trailer is coupled by means of a fifth wheel coupling assembly which provides a point about which the coupled units may pivot. Normally, in a trailer or semi-trailer unit, wheels are located only under the trailing end of the unit, and the front end of the unit is supported by the coupling device attached to the tractor. The tractor includes a steering mechanism for turning its front wheels, and these turning movements cause the trailer to pivot about the coupling point and to follow the path described by the steering movements of the tractor.

Uncontrolled or extreme pivotal movement of the trailer as related to the tractor may result in a jackknifing of the two units. Jackknifing can be described as a condition when the trailer swings into an extreme position about the coupling point and where the trailing end of the trailer approaches the front of the tractor. Such a condition may arise under adverse driving conditions such as where a highway is slippery and the inertia of the trailer carries it into an uncontrollable swing about the tractor.

Devices have been constructed in the prior art which attempt to control and prevent jackknifing conditions, but the prior devices have not been satisfactory in providing a corrective action to such uncontrolled pivotable movements under all driving conditions. In the usual prior art control device, a special effort is required on the part of the driver to actuate the device, or the device is so designed that it controls movements under certain conditions but not under other driving conditions which may arise. Furthermore, the prior attempts to control pivotal movements of a trailer have usually been limited to some type of locking or braking means which merely locks the trailer into a given position and prevents any further extreme movements.

On conventional trailers, the kingpin must be burned out in order to be replaced by a new one, which frequently is necessary due to wear or accident. This is an expensive, inconvenient, and time consuming method of kingpin replacement.

Summary

A fifth wheel assembly for a tractor and a trailer comprising a viscous damper having a kingpin secured thereto on the trailer, a fifth wheel plate having a kingpin receiving slot mounted on the tractor, and a hub concentric with the portion of the kingpin in the viscous damper.

An important object of the present invention is to provide a fifth wheel viscous damper readily mounted on a trailer which has an easily replaceable kingpin.

An object of the present invention is to provide a fifth wheel rotary viscous damper to secure a kingpin to control pivotal movements of the trailer relative to the drawing vehicle such as a tractor.

Another object of the present invention is to provide a fifth wheel coupler with viscous damping of improved design, greater simplicity, higher torque capabilities and lower cost.

Yet a further object of the present invention is to provide a fluid damper for a fifth wheel assembly which automatically acts to prevent jackknifing and other undesirable movements of a trailer relative to a tractor.

Still another object of the present invention is to provide a fifth wheel viscous damper which is capable of being mounted on the trailer of a tractor and trailer and adapted for use with various types of fifth wheel assemblies mounted on a tractor.

Many other advantages, features and additional objects of the present invention will become manifest to those versed in the art on making reference to the detailed description and the accompanying sheets of drawings in which preferred structural embodiments incorporating the principles of the present invention are shown by way of illustrative example.

On the drawings:

FIG. 1 is a partial side elevational view of the tractor and trailer showing the units when coupled and the fifth wheel coupler of the invention;

FIG. 2 is an enlarged side elevational view of the viscous damper and kingpin;

FIG. 4 is a greatly enlarged sectional view of the coupler taken along the line IV—IV of FIG. 3 and;

As shown on the drawings:

Figure 3:
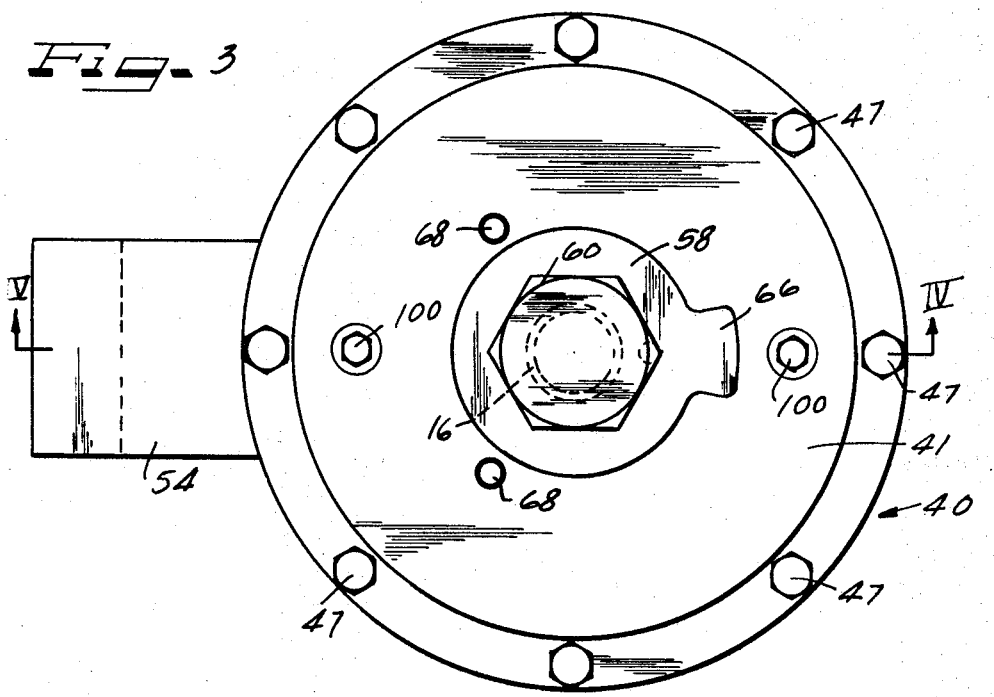
FIG. 3 is a smaller scale top plan view of the viscous damper of FIG. 2.

The principles of this invention are particularly useful when embodied in a fifth wheel coupler with rotary damping for a coupled tractor and trailer illustrated in FIG. 1, generally indicated by the numeral 10.

The tractor and trailer unit 10 of the present invention comprises a tractor or truck 11 which when used in the conventional manner supports the forward end of a trailer or semi-trailer 12. The two units are coupled together by a fifth wheel coupler 14 which is mounted on the rear end of the tractor 11. The fifth wheel coupler 14 is adapted to receive a kingpin 16 extending downwardly from a trailer wear plate 17, FIG. 4, into a fifth wheel plate 18 having a V-shaped slot (not shown). Suitable locking devices (not shown) are provided to hold the kingpin 16 into the coupler 14, and when the trailer 12 is attached to the tractor 11, it can be seen that the trailer may pivot in a horizontal plane about the pivot point defined by the kingpin 16. Such an attachment of a trailer to a tractor is entirely conventional and is designed to permit a trailer to move pivotally in relation to the tractor when the tractor is being steered around curves on a highway.

The fifth wheel plate 18 is pivotally attached to the tractor 11 by a pin 22.

The kingpin 16 is operatively connected to a rotary viscous damper generally indicated at 40 and including an upper generally radially extending annular housing member 41, a lower generally radially extending complementary annular housing member 42 and a rotor assembly 44 therebetween (FIGS. 2 and 4). The lower housing member 42 is of substantial thickness and has a stepped radially outer perimeter providing a lower continuous lateral flange thereon which is joined to the wear plate 17 on the trailer frame as by means of a weld 46 (FIG. 4). The upper housing member 41 is provided on its radially outer margin with a depending annular flange having a lower end radially outwardly extending continuous attachment flange secured onto the flange of the lower housing member 42 as by means of attachment bolts 47. Between the housing members 41 and 42 is provided an annular working chamber 74 having a radially extending portion and a radially outer axially downwardly extending portion and within which chamber the rotor assembly is accommodated.

The kingpin 16 has concentrically corotative therewith a tubular hub member 48 attached to the rotor assembly 44 by means of a spline joint 50. Rotary movement coupling of the hub 48 is effected by a pair of flats on the kingpin 16.

The fifth wheel plate 18, which engages the trailer kingpin 16 has a slot (not shown) within which is engaged a projection 52 on a torque arm 54 secured to an intermediate portion of the kingpin 16 by a weld 56. Rotary movement of the kingpin 16 is limited by a stop plate 58 secured to the upper end of the kingpin 16 by means of a dowel 60 and a bolt 62. The stop plate has a lug projection 66 which allows movement between a pair of stop studs 68 at 104° to either side of the center position.

The viscous damper 40 includes a static sealing ring 70 in the joint between the radially outer attachment flanges of the housing members. A pair of vertically spaced dynamic sealing rings 72 are disposed at the radially inner side of the chamber 74 in the joint between the hub and the housing members (FIG. 4). These rings prevent leakage of viscous damping fluid from the chamber 74. The hub 48 rotates in high impact, low friction vertical bushing bearings 76 and 77 within aligned journal bores provided in the upper and lower housing members and at respectively opposite axial sides of a lateral flange projecting radially outwardly on the hub into the chamber 74 and which flange is engaged between a pair of horizontal high impact, low friction ring bearings 78 and 79. The bearings 76, 77, 78 and 79 may be coated with polytetrafluoroethylene, or steel backed with such material, available under the trademark "DU" and which are high impact, low friction bearings or bushings. About the base end of the hub 48 is an O-ring water and dirt seal 80 in the joint between the hub and the lower housing member 42. At the upper portion of the hub a similar water and dirt seal 82 is provided in the joint between the bushing and the upper housing member 41 and the plate 58. The seals 80 and 82 prevent entrance of water and dirt into the journal joint of the rotary viscous damper 40.

The viscous medium in the chamber 74 is, for example, a silicone fluid of 100,000 centistoke viscosity rating, as measured in a Saybolt viscosimeter, such as has been used with excellent results in viscous dampers. The silicone fluid is operable with substantial uniformity throughout an extreme range of temperature conditions and is therefore especially valuable for this type of coupler. A fill of this fluid is enclosed within the chamber 74, and fills all of the spaces between a radial portion 90 and a radially outer and axially downwardly extending flange portion 92 of the rotor assembly 44. The radial portion 90 has several axial passages 94 therein to allow for communication of the fluid.

The spacing between the opposed working surfaces of the rotor assembly and the upper and lower housing members 41 and 42 is greater than a mere lubricating film, but is much closer than will result in a mere fluid frictional drag relationship between rotor assembly and the viscous fluid, being so calculated that a shear film of the viscous fluid exists between the opposing working surfaces.

The working surface spacing is properly correlated to the viscosity of the fluid to afford a linear velocity gradient, as distinguished from a non-linear velocity gradient, that is, the laminar layers of fluid between the opposed working surfaces are, due to the relative closeness of the spacing between the surfaces, in a condition of shear rather than in a fluid drag relationship. Such working surface spacing may comprise clearances on the order of .010 inch. It will be seen that by having the splined margin of the radial portion 90 of the rotor 44 engaged by and between the ring bearings 78 and 79 (FIG. 4) the shear film spacing is reasonably accurately maintained between the working surfaces of the rotor and the housing members, while the advantages of relative strain relieving flexibility, freedom from axial loads that might be imposed on the rotor by the hub, and the like, are gained from the splined joint 50.

The rotary viscous damper 40 which is mounted on the trailer 12 is capable of having the kingpin 16 removed therefrom by removing the bolt 162 securing the stop and closure plate 58.

The upper housing 41 has a pair of threaded filler plugs 100 in a pair of threaded apertures 102. The upper housing 41 also includes an air collection chamber 106 to prevent air that may unintentionally be present in the working chamber 74 from interfering with the shear films of damping medium between the working surfaces. In practice although care is taken to insure that the viscous fluid damper 40 is filled with the viscous fluid and completely bled of all air at the time of assembly, nevertheless it is possible for dissolved air to escape from the fluid or leak in in the event of slight external leakage of fluid.

The lower housing 42 has formed therein a fluid reservoir 110 which serves a double function of replenishing any leakage as well as accommodating thermal expansion of the viscous fluid to prevent excessive pressure build up in the viscous fluid damper 40 at high temperatures. The reservoir 110 includes a spring 112 operating on a piston 114. At the base of the spring 112 is an air vent 116. The piston has secured therearound on O-ring 118. The spring 112 acts on the piston to insure pressure to maintain a fill of viscous fluid in the working chamber 74.

The provision of the reservoir 110 normally is not required if the operating temperature of the vehicle is limited to approximately 100° F.

By removing the bolt 62 at the top of the viscous fluid damper assembly 40, the kingpin 16 may be removed downwardly from the damper assembly 40 as the kingpin 16 has the torque arm 54 attached thereto on the lower side of the trailer body. In assembly, the damper would normally be welded to the trailer wear plate 17 and the kingpin 16 inserted. This makes the kingpin replacement extremely simple.

The rotary viscous damper 40 is basically of steel and ductile iron construction. The materials are heat treated to trailer requirements specified by the Underwriters, S.A.E., and American Trucking Association.

The upper housing 41 is normally of ductile iron and the lower housing 42 of steel to facilitate welding. The rotor assembly 44 is cadmium plated to minimize a rubbing friction in the event of its occurrence.

The hub 48 is generally of stainless steel to eliminate rusting. The normal damping torque of the fifth wheel viscous damper for trailer-tractors is in the range of 1000-2000 inch pounds per radian per second velocity.

The stop plate 58 is provided, for one reason, to prevent the torque arm from being swung around into a position where it would not engage in the fifth wheel plate slot on the tractor 11.

In operation, the tractor 11 and trailer 12 are joined by having the tractor 11 back into the trailer.

Coupling is assisted by the torque arm which guides the kingpin 16 into the V-slot of the fifth wheel plate 18. When the kingpin 16 has been received in the V-slot, appropriate locking means (not shown) are used to secure the kingpin 16 to the fifth wheel plate 18.

When the tractor 11 is moving in a straight line, slight movements between the trailer 12 and the tractor 11 take place due to road conditions, and tolerances allowed between the tractor and the trailer and the fifth wheel coupler. These slight movements tend to prevent normal tracking of the trailer 12 behind the tractor 11. However, as the kingpin 16 is damped by the rotary viscous damper 40 undue oscillatory movements of the trailer 12 relative to the tractor 11 are prevented.

When it is desired to turn the tractor 11 along a curve or in docking, the driver turns the steering mechanism in the usual fashion and the kingpin 16 turns with the fifth wheel plate 18. The kingpin 16 is locked to the fifth wheel plate 18 by means of the torque arm. Relative motion between the trailer 12 and the tractor 11 are further limited by the stops on the upper housing 41 of the rotary viscous damper 40.

It can be seen that under hazardous road conditions, the rotary viscous damper 40 acts to prevent the initiation of a jacknifing movement by smoothing any extreme or sudden clockwise or counterclockwise pivoting of the trailer due to the damping action of the rotary viscous damper 40. In this respect, in straight line driving down a long grade where braking action of the vehicle may ordinarily tend to establish a whipping or fishtailing of the trailer relative to the tractor, the rotary viscous damper 40 acts to maintain the trailer in a tracking position with respect to the tractor.

The method of controlling the relative pivotal movement between the trailer 12 and tractor 11 to which the trailer is coupled includes coupling the tractor and trailer with the fifth wheel assembly 14 and kingpin 16 and locking the kingpin in the fifth wheel plate 18. The method further includes securing the kingpin 16 in the viscous damper 40 by the bolt 62, preventing relative rotary movement of the kingpin and fifth wheel assembly by engaging the torque arm 54 in the fifth wheel plate 18 and thereby damping the rotary movement between the kingpin and fifth wheel assembly.

The apparatus of the invention just described is easily manufactured, and installation is readily effected by mounting of the rotary viscous damper as taught on the trailer in operative relation to the fifth wheel coupler on the tractor. The use of the rotary viscous damper 40 provides a smoother control of the coupled tractor and trailer 10 under a wider range of driving conditions than with prior control devices.

Figure 5:
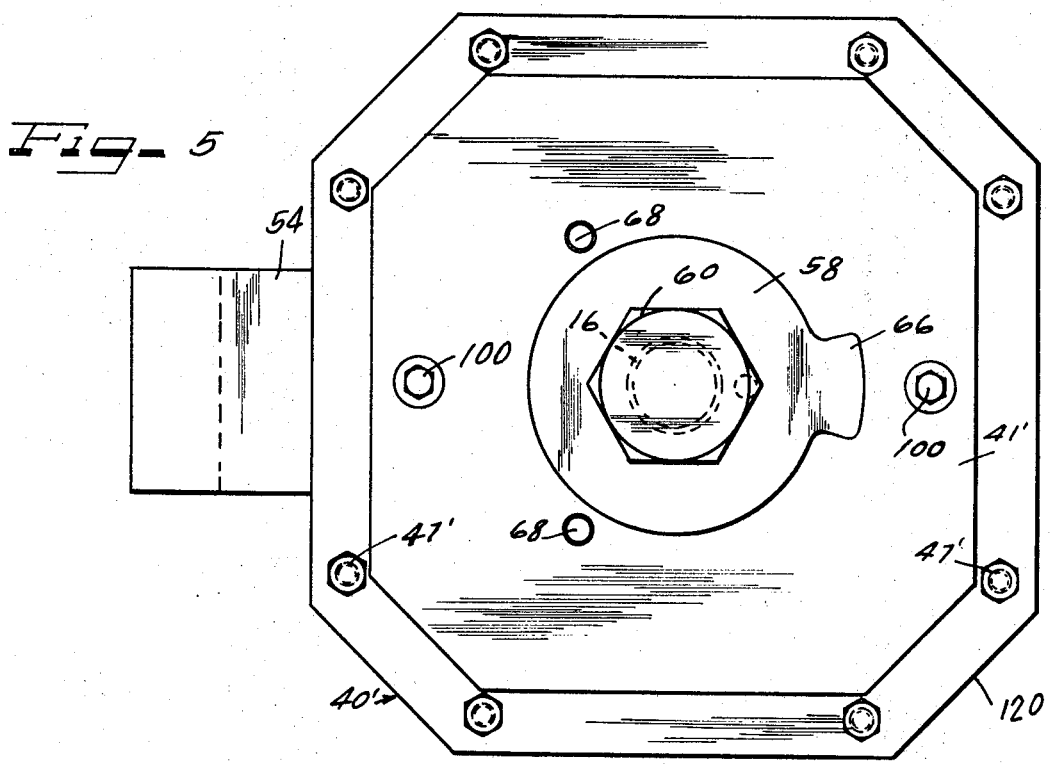
FIG. 5 is a top plan view of a modified coupler similar to FIG. 3.

The viscous damper may be conveniently made within a square housing 40', FIG. 5. This facilitates assembly in the trailer bed. The damper 40' is then normally welded to the trailer wear plate 17 at the corners 120, the kingpin 16 inserted and the bolt 62 threaded thereto.

Although minor modifications might be suggested by those versed in the art, it should be understood that we wish to embody within the scope of the patent warranted hereon all such embodiments as reasonably and properly come within the scope of our contribution to the art.

We claim:

1. A fifth wheel viscous damper construction, comprising:
   a housing providing a working chamber therein;
   a rotor in said working chamber;
   said rotor and said working chamber having confronting working surfaces in shear film spaced relation;
   a hub connected to said rotor and rotatably mounted in said housing with its opposite ends exposed at opposite ends of the housing and receptive of a co-rotatable member;
   dynamic seals between said hub and said housing to prevent leakage from said working chamber along said hub; and
   water and dust seals between the outer end portions of said hub and said housing.

2. A damper according to claim 1, including bushing bearings between said dynamic seals and said water and dust seals.

3. A fifth wheel viscous damper construction, comprising:
   a housing providing a working chamber therein;
   a rotor in said working chamber;
   said rotor and said working chamber having confronting working surfaces in shear film spaced relation;
   a hub connected to said rotor and rotatably mounted in said housing with its opposite ends exposed at opposite ends of the housing and receptive of a co-rotatable member;
   said rotor and said hub having a splined connection; and
   bearings supporting said rotor to maintain the shear film spaced relation between said working surfaces while affording the advantages of flexibility of said splined connection.

4. A damper according to claim 3, said bearings comprising high impact, low friction rings.

5. A damper according to claim 4, said hub having a lateral flange, said splined connection of the rotor being with said flange, said bearing rings engaging said flange and said rotor therebetween adjacent to the splined connection.

6. A damper according to claim 3, said rotor having a lateral flange thereon extending into said chamber, said splined connection being with said flange, and said bearing being common to said flange and said rotor at said splined connection.

7. A fifth wheel viscous damper construction comprising:
   a housing providing a working chamber therein;
   a rotor in said working chamber;
   said rotor and said working chamber having confronting working surfaces in shear film spaced relation;
   a hub connected to said rotor and rotatably mounted in said housing with its opposite ends exposed at opposite ends of the housing and receptive of a co-rotatable member;
   said housing comprising upper and lower annular housing members about said hub, said lower housing member having a stepped radially outer perimeter providing a lateral continuous flange, said upper housing member having an axially downnwardly extending outer marginal flange portion including a laterally radially outward continuous attachment flange;
   means securing said attachment flange and said lower housing member flange together;
   said working chamber having a radially extending portion and an axially downwardly extending portion between said housing members; and
   said rotor being of substantially L-shaped radial cross section having a radially extending portion and an axially downwardly extending radially outer portion complementary to said chamber and both of said rotor portions and said chamber having confronting shear film spaced working surfaces.

8. A damper according to claim 7, said rotor having a flexible connection with said hub, and bearing means maintaining said rotor and said housing members in substantially accurate shear film spaced relation.

9. A fifth wheel viscous damper construction, comprising:
   a housing providing a working chamber therein;
   a rotor in said working chamber;

said rotor and said working chamber having confronting working surfaces in shear film spaced relation;

a hub connected to said rotor and rotatably mounted in said housing with its opposite ends exposed at opposite ends of the housing and receptive of a co-rotatable member;

a flexible connection between said hub and said rotor;

bearing means maintaining shear film spaced relation of the rotor and the housing;

said chamber having a radially extending portion and an axially extending portion and said rotor having complementary portions within said housing portion all of which portions and said housing portion having said shear film spaced working surfaces;

dynamic seals between said hub and said housing preventing leakage from the housing along the hub;

water and dust seals between the opposite end portions of the hub and the housing; and bushing bearings of high impact, low friction material journalling said hub between said dynamic seals and said water and dust seals.

10. A damper according to claim 9, including, in combination, a kingpin in said hub and extending from one end thereof, and means securing said kingpin in place including a closure and retaining plate extending across the opposite end of said hub and across the water and dust seal at such opposite end and a bolt securing said plate and said kingpin together releasably.

References Cited

UNITED STATES PATENTS

| | | | |
|---|---|---|---|
| 2,170,898 | 8/1939 | Humphrey | 280—432 |
| 2,661,917 | 12/1953 | O'Connor | 244—104 |
| 3,328,051 | 6/1967 | Hope | 280—432 |
| 2,692,146 | 10/1954 | Black | 280—432 |
| 3,373,633 | 3/1968 | Desmond et al. | 188—90 X |
| 3,420,548 | 1/1969 | Wakeman | 280—432 |
| 3,430,896 | 3/1969 | Labrecque | 188—90 X |
| 3,424,406 | 1/1969 | Rumsey et al. | 188—90 X |
| 3,439,936 | 4/1969 | Hines | 280—432 |

FOREIGN PATENTS

| | | |
|---|---|---|
| 205,442 | 9/1956 | Australia. |
| 624,762 | 8/1961 | Canada. |

LEO FRIAGLIA, Primary Examiner

U.S. Cl. X.R.

188—90; 280—446